US008807848B2

(12) United States Patent
Jensen

(10) Patent No.: US 8,807,848 B2

(45) Date of Patent: Aug. 19, 2014

(54) SYSTEMS AND METHODS FOR COUPLING COMPONENTS

(75) Inventor: Justin Jensen, Austin, TX (US)

(73) Assignee: Cinetics of Texas, LLC, Austin, TX (US)

(*) Notice: Subject to any disclaimer, the term of this patent is extended or adjusted under 35 U.S.C. 154(b) by 77 days.

(21) Appl. No.: 13/457,176

(22) Filed: Apr. 26, 2012

(65) Prior Publication Data

US 2012/0287336 A1 Nov. 15, 2012

Related U.S. Application Data

(60) Provisional application No. 61/485,678, filed on May 13, 2011.

(51) Int. Cl.

*G03B 17/00* (2006.01)

*B60B 33/00* (2006.01)

(52) U.S. Cl.

USPC ................................ 396/419; 396/426; 16/45

(58) Field of Classification Search

USPC ................. 396/419–423, 428; 248/127–129, 248/187.1; 16/18 R, 21, 45; 403/302, 304, 403/310

See application file for complete search history.

(56) References Cited

U.S. PATENT DOCUMENTS

| | | | | |
|---|---|---|---|---|
| 4,852,836 | A | 8/1989 | Kawazoe | |
| 6,439,515 | B1 * | 8/2002 | Powers | 248/129 |
| 7,077,369 | B2 | 7/2006 | Hardin | |
| 2009/0052885 | A1 * | 2/2009 | Cramer | 396/428 |

OTHER PUBLICATIONS

Cineultima's "3PC Floor Wheels for Floor Board Tripod Dolly System" at www.cineultima.com, 3 pages.

Walimex Tripod Wheels Pro, Set of 3 No. 12720, at http://www.walimex.ch/product_info.php/language/en/info/p287_walimex-Stativrollen-Pro-3er-Set-Nr-12720.html, 2006, 1 page.

* cited by examiner

*Primary Examiner* — WB Perkey

*Assistant Examiner* — Minh Phan

(74) *Attorney, Agent, or Firm* — Baker Botts L.L.P.

(57) ABSTRACT

The present disclosure includes a system including a receptacle component configured to detachably couple with an elongate member, and a support member configured to detachably couple with the receptacle component, the support member configured such that an upper portion of the support member detachably couples with an opening of the receptacle component. The present disclosure also includes a system including a plate comprising a plurality of first support members, a plurality of arms, at least one of the plurality of first support members disposed upon at least one of the plurality of arms. The system also includes a plurality of second support members, the second support members configured to removably couple with the first support members.

7 Claims, 16 Drawing Sheets

SYSTEMS AND METHODS FOR COUPLING COMPONENTS

PRIORITY INFORMATION

The present application claims priority under 35 U.S.C. §119(e) to U.S. Provisional Patent Application Ser. No. 61/485,678, filed May 13, 2011 and incorporated by reference herein.

TECHNICAL FIELD

Embodiments described herein relate, generally, to systems and methods usable to adapt a mounting device (e.g., a tripod) for use capturing images (e.g., taking photographs and/or recording or streaming video images) while moving and/or while positioned in an unorthodox position (e.g., secured to a wall, ceiling, or non-level surface). More specifically, some embodiments described herein may include attachment members engageable to the distal end of the legs of a tripod or similar mounting device.

Alternative embodiments described herein relate, generally, to systems and methods for coupling components, including a receptacle component and a support member. Other embodiments described herein relate, generally, to systems and methods for capturing images in conjunction with motion.

BACKGROUND

Conventional devices for providing movement to a camera tripod or similar mounting device are used primarily to facilitate the transport of equipment between uses, but do not provide the sufficiently steady or defined motion necessary to enable smooth image capture while the camera tripod is moving. Specifically, such devices include dollies, which typically include a platform base having multiple wheels extending from a lower side, while the legs of a tripod or similar mounting device are engaged with the upper side. Some dollies include an integral mounting pole or similar protruding member for direct engagement with a camera, without requiring a tripod or intermediate mounting device. In addition to a lack of suitability for use capturing images while moving, these devices are typically expensive, and may be heavy and cumbersome to transport. While the transportability of recording equipment has been enhanced somewhat through the use of tripods having integral, retractable, and/or removable wheels, such transportation has proven unsuitable for use during recording of images.

Most often, when attempting to capture smooth, continuous video images or similar images that require movement of a camera, extensive and costly studio equipment is required. For example, a video camera may be fixedly mounted on tracks or rails that extend along a selected path, and the camera may be moved thereon, such as through use of motors or other means of locomotion. Alternatively, to provide the appearance of a moving camera, a series of adjacent cameras (e.g., a light field array) may be used to capture still images in rapid succession, which may then be compiled together to create the appearance of camera movement; however, the expense of this technique is substantial. Thus, both of these methods require significant time, equipment, and expense, making them prohibitive for amateur and/or recreational use, or for use in applications where portability and speed are required. As such, a need exists for systems and methods for adapting a mounting device to facilitate capturing of images that are suitable for use during recording of images, inexpensive, portable, and efficient to install and remove, as needed.

BRIEF DESCRIPTION OF THE DRAWINGS

In the detailed description of various embodiments of the present disclosure, presented below, reference is made to the accompanying drawings, in which.

DETAILED DESCRIPTION

Figure 1:
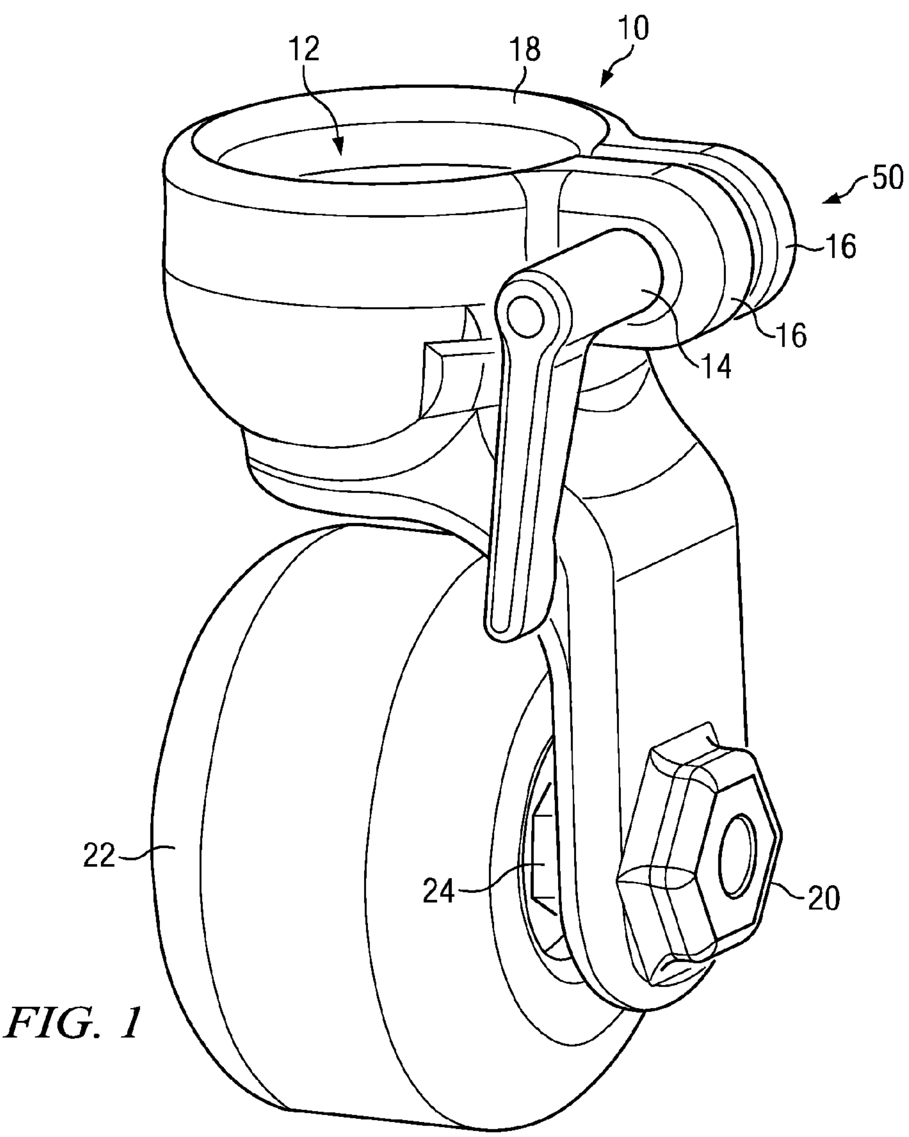
FIG. 1 depicts an isometric view of an example attachment member and a wheel, in accordance with embodiments of the present disclosure.

Before describing selected embodiments of the present disclosure in detail, it is to be understood that the present disclosure is not limited to the particular embodiments described herein. The disclosure and description herein is illustrative and explanatory of one or more embodiments of the disclosure and variations thereof, and it will be appreciated by those skilled in the art that various changes in the design, organization, order of operation, means of operation, equipment structures and location, methodology, and use of mechanical equivalents may be made without departing from the spirit of the disclosure.

As well, it should be understood the drawings are intended to illustrate and plainly disclose embodiments of the disclosure to one of skill in the art, but are not intended to be manufacturing level drawings or renditions of final products and may include simplified conceptual views as desired for easier and quicker understanding or explanation of the disclosure. As well, the relative size and arrangement of the components may differ from that shown and still operate within the spirit of the disclosure as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made in accordance with the concepts herein taught, and because many modifications may be made in the embodiments described herein, it is to be understood that the details herein are to be interpreted as illustrative and non-limiting.

Some embodiments described herein relate to systems and methods for recording images and/or providing selected motions and/or positions to a tripod or similar mounting device usable to support a camera or similar recording device. While the embodiments described herein are of particular use for recording video images, embodiments described herein may also be used to capture one or more still images from a desired position (e.g., to perform time-lapse photography), to capture still images that require long shutter exposure and/or movement of the camera (e.g., when performing motion blur photography), and/or other applications outside the field of photography. Further, in some embodiments, the recording device may be configured to capture and store, capture and broadcast, capture and stream, or capture and discard an image.

Embodiments in accordance with the present disclosure may include systems and methods in which portable, inexpensive devices may be used to enable movement and/or desired positioning to a camera or other item of equipment, e.g., through attachment of a plurality of apparatuses to the distal end of each leg of a camera tripod. Each apparatus may be installed, removed, and/or interchanged efficiently. Some embodiments enable a camera to be provided with wheels capable of smooth, continuous, and/or defined motion while recording video images and/or other types of images during movement of the camera, while other embodiments enable a camera to be provided with stabilizing feet for positioning the camera relative to a surface, magnets for adhering to a ferromagnetic object, and/or various other fasteners, such as suction cups, hook and loop fasteners (e.g., Velcro™), adhesives, mounting brackets, or combinations thereof, for positioning the camera relative to a surface. Further embodiments may include use of pulleys engaged with the attachment members for enabling a camera and/or mounting device to be moved along a cable or aerial path, narrow blades to enable movement of the mounting device along the surface of an ice rink or similar reduced friction surface, floats to enable positioning and/or movement of the mounting device on a body of water, ball-type casters to enable free rolling of the mounting device in one or multiple desired directions, and/or controllable motorized wheels or similar positioning members, to enable controlled and/or remote movement of a camera and mounting device.

In a further embodiment, wheels and/or similar positioning members may be removable from the attachment members and attached to a platform (e.g., a dolly-type apparatus) having receptacles adapted to engage the wheels and/or positioning members.

Unitary Embodiment

Referring now to FIG. 1, an isometric view of an embodiment of an attachment member (10), in accordance with embodiments of the present disclosure. As shown in FIG. 1, the depicted attachment member (10) may include a device usable to secure a wheel (22) to a mounting device (e.g., a tripod for a camera). The attachment member (10) may include a receptacle (12), shown in FIG. 1 as a generally hemispherical, cup-shaped bore, usable to receive the distal end of the leg of a tripod, or a similar elongate member. However, the receptacle (12) may be any feature able to engage the distal end of the leg of a tripod, or a similar elongate member. The receptacle may comprise an aperture. The attachment member (10) may further comprise a coupling component (50). The coupling component (50) may detachably couple the attachment member (10) to the distal end of the leg of a tripod, or a similar elongate member. In some embodiments, once inserted into the receptacle (12), the distal end may be engaged by tightening the receptacle (12) thereto by using the coupling component (50).

FIG. 1 depicts one embodiment of a coupling component (50), that may include a mechanism for tightening and loosening the receptacle (12). This may include a handle (14) usable to bias two adjacent compression flanges (16) through which the axle of the handle (14) protrudes toward one another, and/or to permit the compression flanges (16) to move away from one another. The compression flanges (16) may extend from the circumference (18) of the receptacle (12), thus through manipulation of the handle (14) to bias the compression flanges (16), the circumference (18) may be tightened about the distal end of a tripod leg, or loosened, rapidly, as desired. It should be understood, however, that other mechanisms for attaching the receptacle (12) to an object are also usable, such as a snap-fit or force-fit engagement, and/or various pins, latches, clasps, clamps, clips, or other similar fasteners. Further, while FIG. 1 depicts a handle (14) that may be manually rotated to bias the compression flanges (16), other embodiments may include removable handles, an integral or removable ratcheting device, or other similar mechanisms for tightening the receptacle (12) about an object. Additionally, in some embodiments, the attachment may be accomplished without the use of tools, or by hand.

In an alternative embodiment, coupling component (50) may comprise an alternative means for biasing the compression flanges (16). This may be a threaded member that passes through the compression flanges (16) and is fixed on one end such that when a rotatable member is attached to the other end of the threaded member and rotated, the compression flanges are forced towards each other or permitted to move away from one another, depending on the direction of rotation. This rotatable member may be a dial or other easily graspable form. In some embodiments, this dial may have ridges configured to grant an operator increased convenience in rotating the dial. Further, such an embodiment may allow an operator to accomplish the attachment without tools, or by hand.

The depicted embodiment may further have a fastener (20), shown as a nut-and-bolt arrangement, used to secure the wheel (22) thereto. In use, a plurality of attachment members (10) may be attached to the legs of a tripod or similar mounting device to secure wheels (22) thereto. The wheel (22) may further have an axle (24) with a bearing arrangement therein that may enable smooth and continuous rolling to facilitate recording of video images or other types of images that require camera movement, while the wheel (22) may be in motion. A fixed and/or lockable connection between the receptacle (12) and the wheel (22) may prevent the wheels (22) from changing direction, enabling an attached camera and/or mounting device to be rolled smoothly along a desired path or in a desired direction by fixing the wheels (22) in a desired orientation. The fixed and/or lockable connection may be achieved by the tension fit between the distal end of the tripod or other elongate member, or may be facilitated by teeth or ridges. While any orientation between the receptacle (12) and the wheel (22) or other object attached thereto may be usable, FIG. 1 depicts the receptacle (12) above the wheel (22) having a central axis that intersects the central axis of the wheel (22), enabling a tripod having adjustable and/or flexible legs or a similar device to be engaged to the wheel (22) from a variety of angles and/or positions. In these embodiments, such intersections of the central axis of the wheel (22) and the central axis of the receptacle (12) may be substantially perpendicular, or there may be other angles between the two axes. In other embodiments, the wheels (22) may include casters to enable free rolling of the mounting device in any desired direction.

Figure 2A:
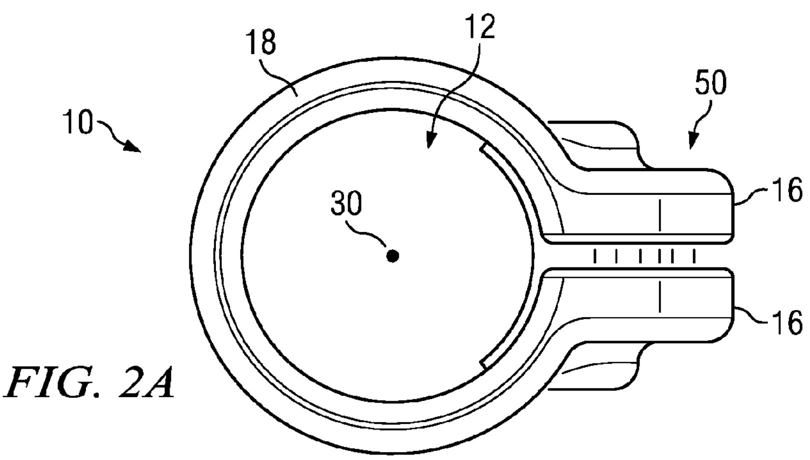
FIG. 2A depicts a top view of an embodiment of an example attachment member, in accordance with embodiments of the present disclosure.
Figure 2B:
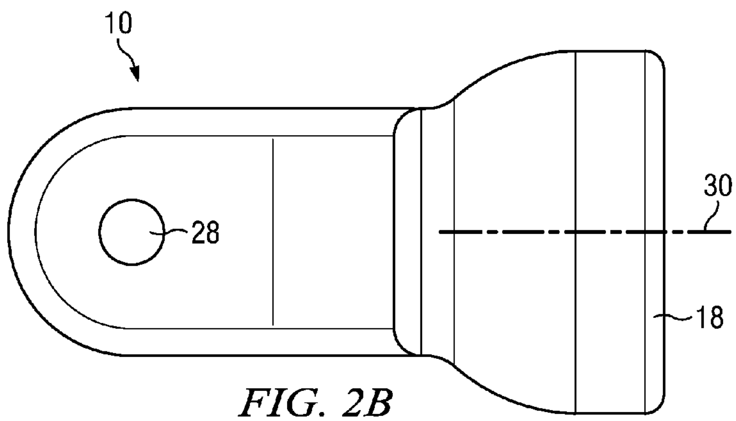
FIG. 2B depicts a side view of the example attachment member of FIG. 2A, in accordance with embodiments of the present disclosure.
Figure 2C:
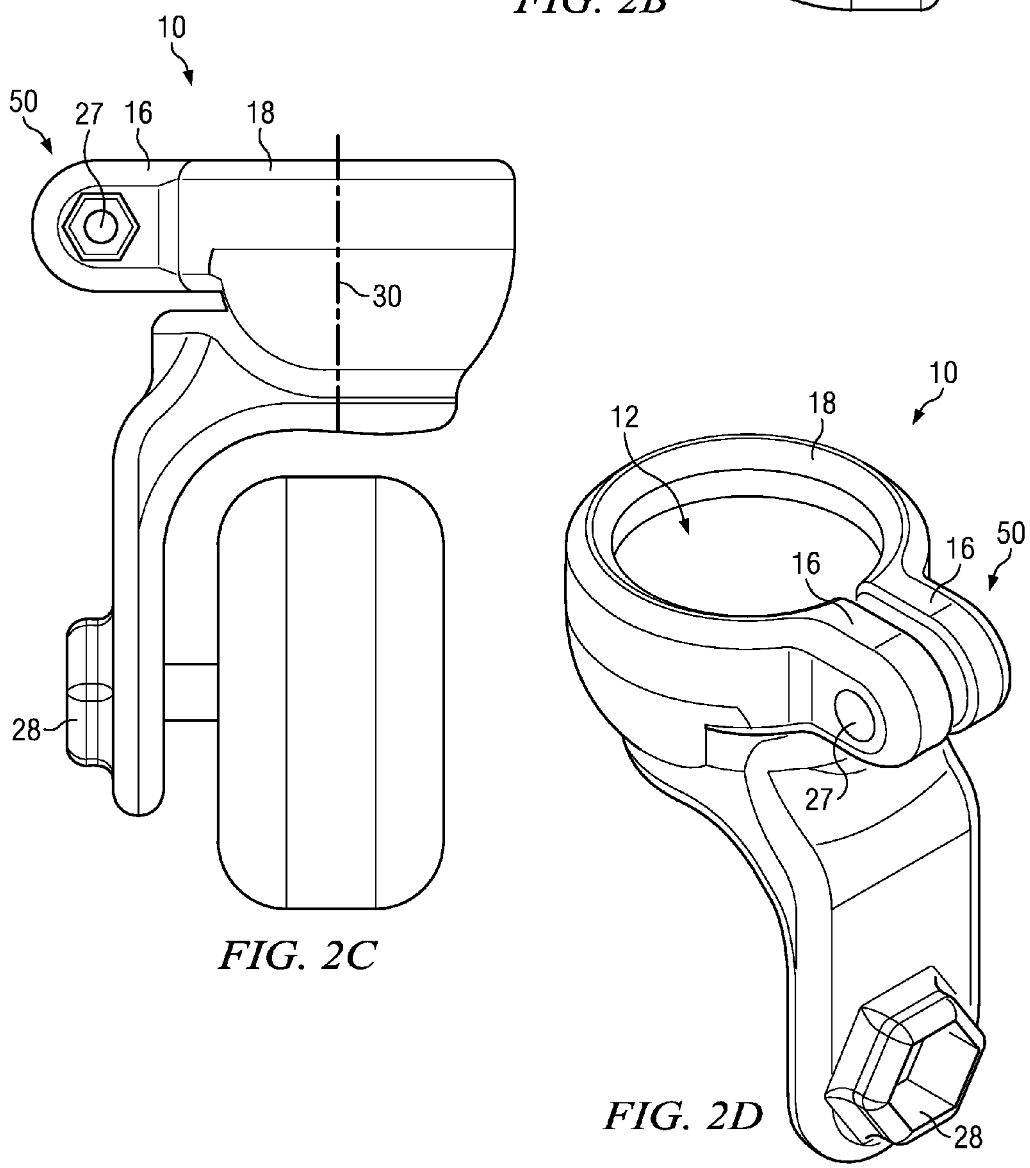
FIG. 2C depicts a front view of the example attachment member of FIGS. 2A and 2B, in accordance with embodiments of the present disclosure.
Figure 2D:
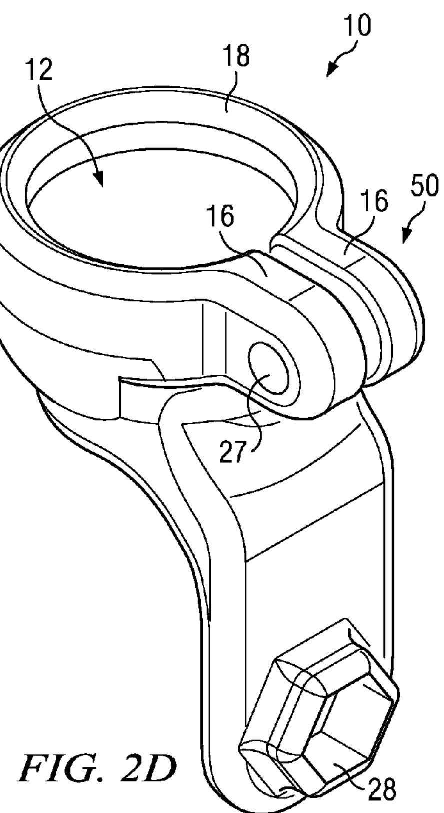
FIG. 2D depicts an isometric view of the example attachment member of FIGS. 2A through 2C, in accordance with embodiments of the present disclosure.
Figure 3A:
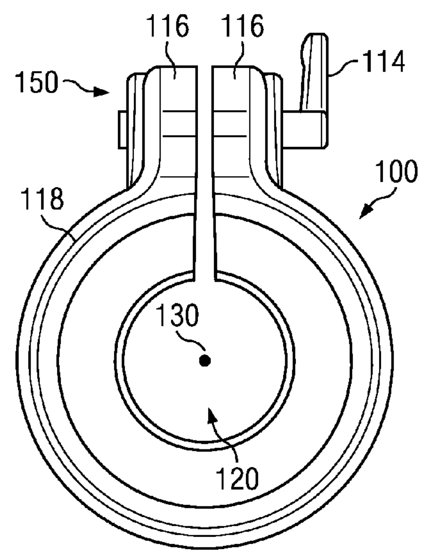
FIG. 3A depicts a top view of an example of a receptacle component, in accordance with embodiments of the present disclosure.
Figure 3B:
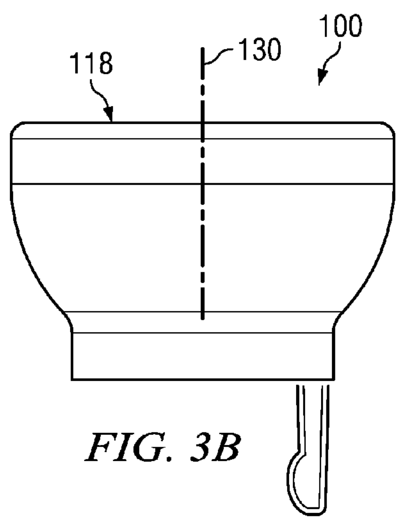
FIG. 3B depicts a side view of the example receptacle component of FIG. 3A, in accordance with embodiments of the present disclosure.
Figure 3C:
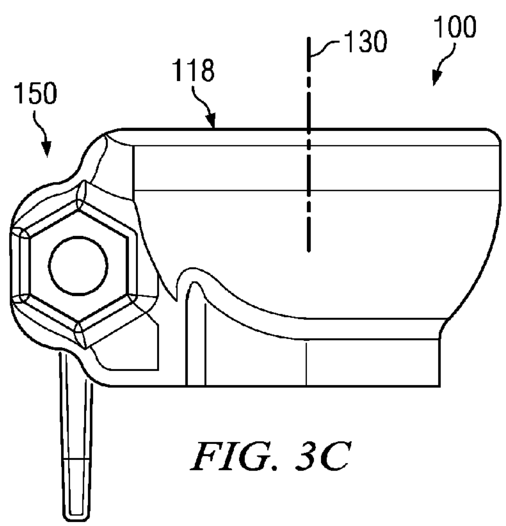
FIG. 3C depicts a front view of the example receptacle component of FIGS. 3A and 3B, in accordance with embodiments of the present disclosure.
Figure 3D:
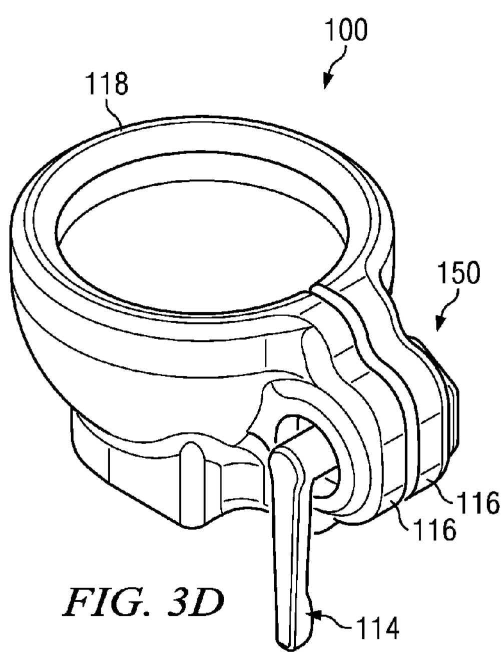
FIG. 3D depicts an isometric view of the example receptacle component of FIGS. 3A through 3C, in accordance with embodiments of the present disclosure.

Referring now to FIGS. 2A through 2D, an embodiment of an attachment member (10) similar to that shown in FIG. 1 is depicted. Specifically, FIG. 2A shows a top view of the attachment member (10), FIG. 2B shows a side view thereof, FIG. 2C a front view, and FIG. 2D an isometric view.

As described previously, the attachment member (10) may have a receptacle (12) for receiving a distal end of a tripod leg or similar elongate object, and a coupling component (50). The coupling component (50) may have two compression flanges (16) having aligned bores (27) extending therethrough for receiving a rod, pin, or similar object for use selectively biasing the compression flanges (16) toward one another, to selectively reduce the circumference (18) of the receptacle (12). A lower bore (28) may be usable to engage a wheel in the manner shown in FIG. 1. Alternatively, the lower bore (28) may be used to engage other positioning members, such as a stabilizing foot, a magnet, or one or more fasteners, usable to position an object secured within the receptacle (12) relative to a desired surface, in a desired orientation.

As shown in FIGS. 2A through 2D, the central axis (30) of the receptacle (12) may be positioned above the area in which a wheel or similar positioning member would be installed, such that when operatively engaged, the axis (30) of the receptacle (12), and/or the axis of the portion of the leg or other object engaged therewith, will generally intersect the center of a wheel or other positioning member attached thereto. In some embodiments, the central axis (30) may extend vertically through about the center of the receptacle (12). While this particular arrangement of components reduces the overall size and/or bulk of the attachment member (10) and may be suitable for engagement with a tripod having flexible legs, other embodiments may include differing angles and/or arrangements between the receptacle (12) and the remainder of the attachment member (10), suitable for engagement with a non-flexible leg of a tripod that extends at a fixed angle.

Distinct Receptacle Component and Support Member Embodiment

Referring now to FIGS. 3A through 5D, an alternative embodiment of an attachment member (10) is shown. In some embodiments, the attachment member (10) may comprise multiple components, including, for example, a receptacle component and a support member, which may be detachably coupled.

Receptacle Component

Referring to FIGS. 3A through 3D, an example receptacle component (100) is shown. The receptacle component (100) as shown may comprise an aperture shown as a hemispherical, cup-shaped bore, usable to receive the distal end of the leg of a tripod, or a similar elongate member. However, the receptacle component may comprise any feature able to engage the distal end of the leg of a tripod, or a similar elongate member. The receptacle component (100) may further comprise a coupling component (150). The coupling component (150) may detachably couple the receptacle component (100) to the distal end of the leg of a tripod, or a similar elongate member. In some embodiments, once inserted into the receptacle component (100), the distal end may be engaged by tightening the receptacle component (100) thereto by using the coupling component (150).

The aperture shown as a hemispherical, cup-shaped bore, may be texturized on the internal surface of the bore. This may provide increased static friction and thus a more secure connection between the receptacle component and the distal end of the leg of a tripod, or a similar elongate member. Any texture that will increase the static friction between the two members may be used. For example, the texture may be generally rough, without any particular order to the texture. Alternatively, the texture may be more ordered such as ridges, divots, bumps, or the like.

In some embodiments, coupling component (150) may comprise a mechanism for tightening and loosening the receptacle component (100) including a handle (114) usable to bias two adjacent compression flanges (116) through which the axle of the handle (114) protrudes toward one another. The compression flanges (116) extend from the circumference (118) of the receptacle component (100). Thus, through manipulation of the handle (114) to bias the compression flanges (116), the circumference (118) may be tightened about the distal end of a tripod leg, or loosened, rapidly, and/or by hand, as desired. Alternatively, a dial may be used as described previously. It should be understood, however, that other embodiments of a coupling component (150) for coupling the receptacle component (100) to an object are also usable, such as a snap-fit or force-fit engagement, and/or various pins, latches, clasps, clamps, clips, or other similar fasteners. Further, while FIGS. 3A-3D depict a handle (114) that may be manually rotated to bias the compression flanges (116), other embodiments may include removable handles, an integral or removable ratcheting device, or other similar mechanisms for tightening the receptacle component (100) about an object. Alternatively, a dial may be used as described previously. Further, this may be accomplished without the use of tools, or by hand.

The receptacle component (100) may further comprise an opening (120) for receiving a support member. The opening (120) may be configured to receive and engage a support member, and lock that support member in a particular orientation. In some embodiments, this may be accomplished by ridges in the circumference of the opening (120) that would couple with ridges of a support member. In other embodiments, this may be accomplished by the tension between the support member and the circumference of the opening (120). In other embodiments, the opening (120) may be configured to allow the support member to rotate freely within the opening (120). The opening (120) may also be configured to easily release the support member. The opening (120) may be configured to receive a variety of support members in a variety of configurations.

The coupling component (150) may perform multiple functions as the handle or dial is manipulated and the compression flanges (116) are drawn closer together. This may secure the connection between the receptacle component and the distal end of the leg of a tripod, or a similar elongate member, while at the same time securing the connection between the receptacle component and the support member. In this manner, only a single movable part must be manipulated to secure multiple connections. Alternatively, multiple handles and/or dials may be employed to secure multiple connections.

The receptacle component (100) may further comprise a central axis (130). The central axis (130) of the receptacle component (100) may be positioned above the area in which a support member would be engaged, such that when operatively engaged, the axis (130) of the receptacle component (100), and/or the axis of the portion of the leg or other object engaged therewith, will generally intersect the central axis of the support member attached thereto. The central axis (130) may extend vertically through about the center of the opening (120). While this particular arrangement of components reduces the overall size and/or bulk of the attachment member (10) and may be suitable for engagement with a tripod having flexible legs, other embodiments may include differing angles and/or arrangements between the receptacle component (100) and the remainder of the attachment member, suitable for engagement with a non-flexible leg of a tripod that extends at a fixed angle.

The receptacle component may be configured in a variety of sizes to accommodate different shapes, sizes, or configurations of tripods or other elongate members. For example, the aperture may be one size to receive a first flexible tripod leg in one embodiment, and the aperture may be a second smaller size to receive a second smaller flexible tripod leg in an alternative embodiment. In another example, the opening may be one size to receive a first-sized support member in one embodiment, and the opening may be a smaller size to receive a smaller second-sized support member in an alternative embodiment.

In some embodiments, the receptacle component may further be configured to limit the movement of the support member to two dimensions (e.g., planar). This may be in contrast to a traditional ball-socket joint which allows movement of a component in three dimensions. In such an embodiment, for example, a support member may be limited to rotating about the central axis of the receptacle component.

Support Member

Referring now to FIGS. 4A through 4D, one example of a support member (200) is shown. The support member may comprise an engaging member (210) configured to engage the opening (120) of the receptacle component (100). The engaging member (210) may comprise an upper portion (215) shaped generally as a spherical segment. The engaging member (210) may include a cleft (255) to create two apposing flanges (220). The cleft (255) may traverse substantially all of the upper portion (215). The cleft (255) may also pass beyond the upper portion (215). In some embodiments, the cleft (255) may be configured to function as a visual marker as a fixed point in relation to other moveable components. The combination of the upper portion (215) and the apposing flanges (220) may be configured such that when the upper portion (215) is forced against the opening (120) of the receptacle component (100), the curvature of the spherical segment forces the apposing flanges (220) in proximity to each other such that the upper portion (215) may pass through the opening (120). The upper portion (215) may be further configured such that once it has passed through the opening (120), the curvature of the spherical segment of the upper portion (215) causes the apposing flanges (220) to return to their original separated position. This may prevent the engaging member (210) from passing back out of the opening (120) without an appropriate force being applied, thus maintaining a detachable connection between the support member (200) and the receptacle component (100). It will be appreciated, however, that any attachment means may be used to couple the support member (200) to the receptacle component (100), including, and not limited to, a snap-fit or force-fit engagement, and/or various pins, latches, clasps, clamps, clips, or other similar fasteners. This may further be accomplished by one or both of the support member (200) and receptacle component (100) having threads such that they may be screwed together, or by any other means as is known in the art.

Figure 4A:
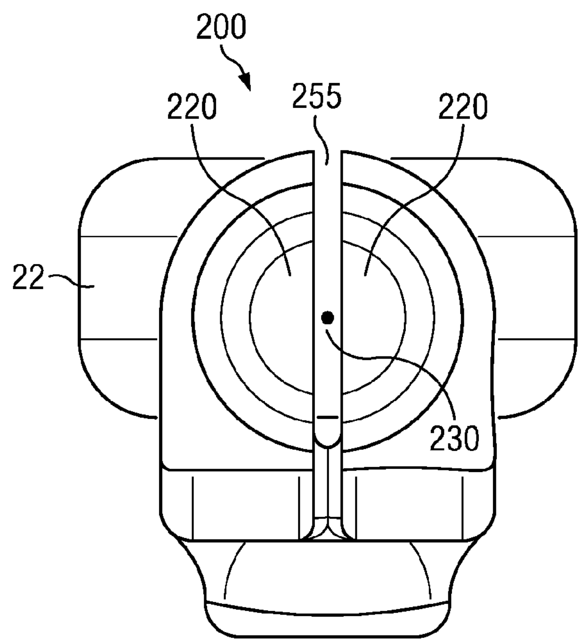
FIG. 4A depicts a top view of an example support member, in accordance with embodiments of the present disclosure.
Figure 4B:
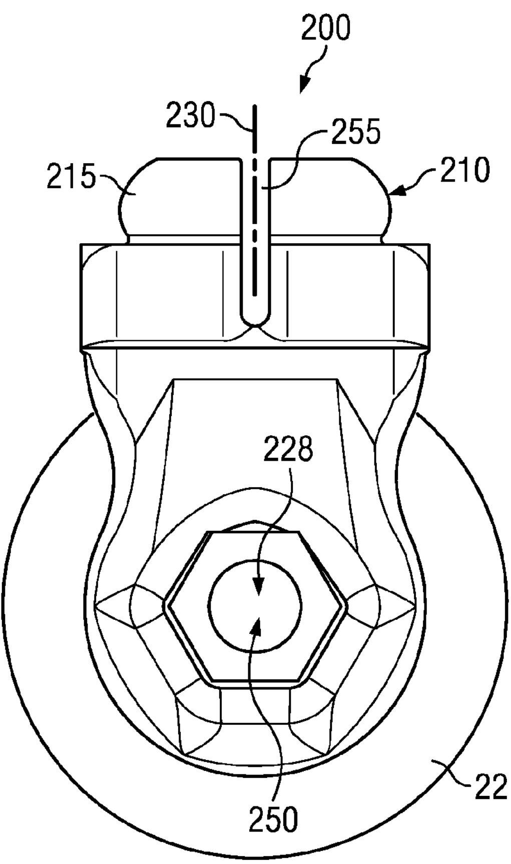
FIG. 4B depicts a side view of the example support member of FIG. 4A, in accordance with embodiments of the present disclosure.
Figure 4C:
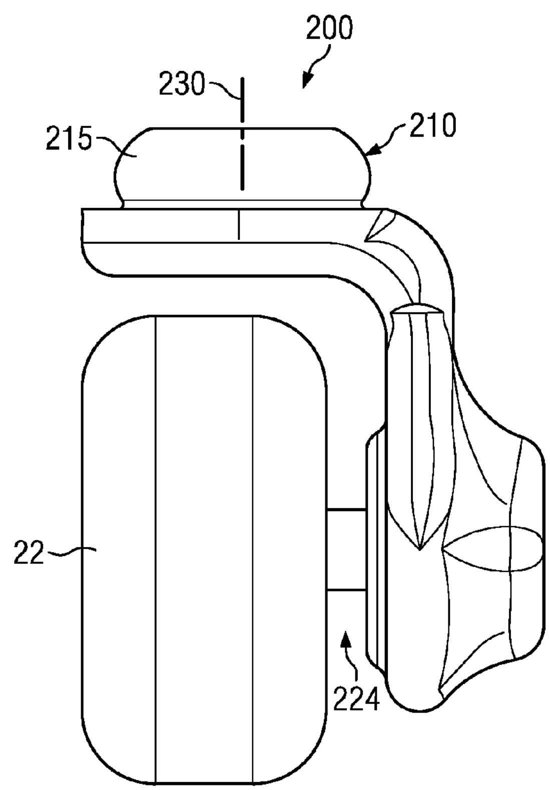
FIG. 4C depicts a front view of the example support member of FIGS. 4A and 4B, in accordance with embodiments of the present disclosure.
Figure 4D:
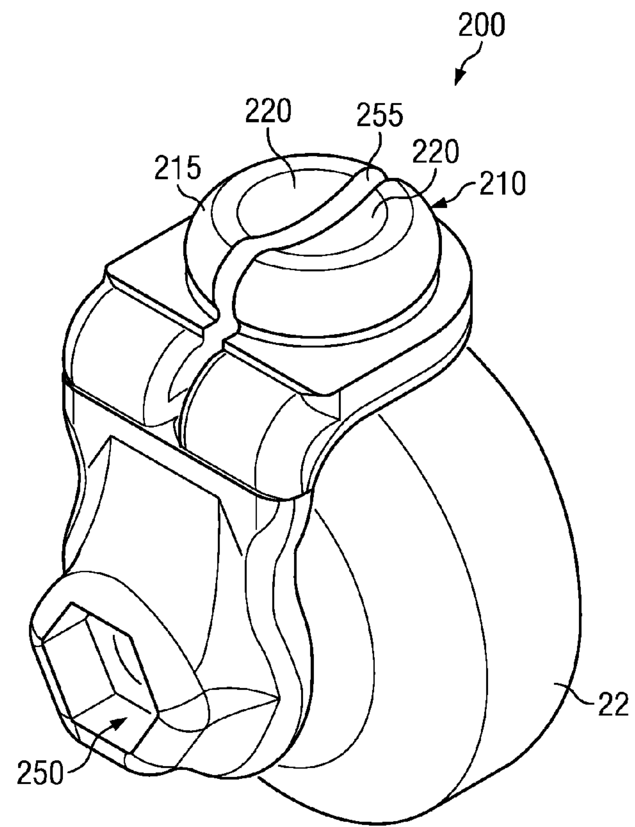
FIG. 4D depicts an isometric view of the example support member of FIGS. 4A through 4C, in accordance with embodiments of the present disclosure.
Figure 5A:
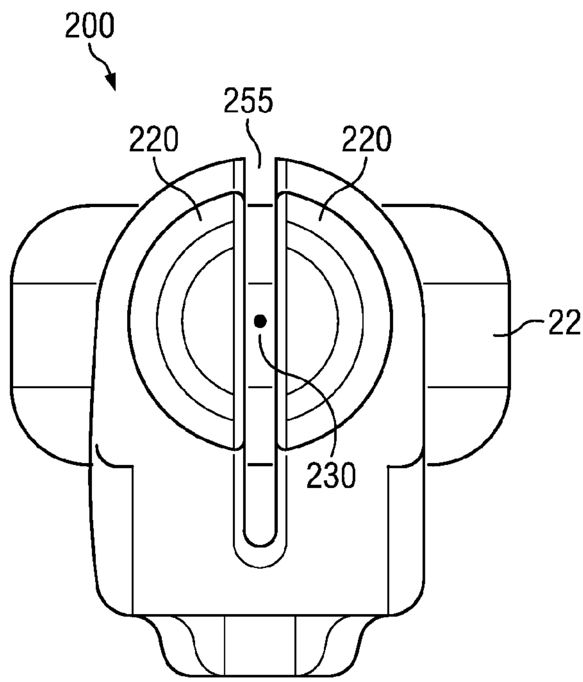
FIG. 5A depicts a top view of another example of a support member, in accordance with embodiments of the present disclosure.
Figure 5B:
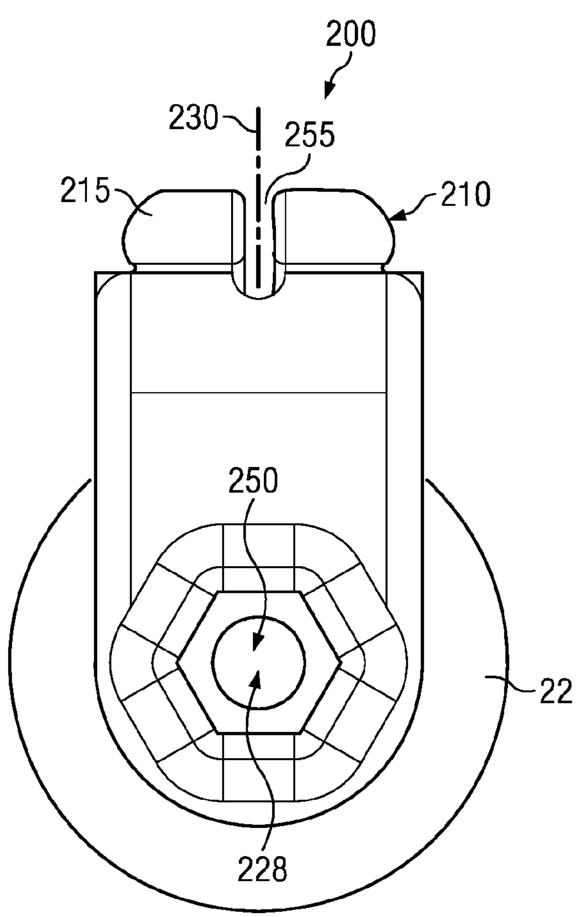
FIG. 5B depicts a side view of the example support member of FIG. 5A, in accordance with embodiments of the present disclosure.
Figure 5C:
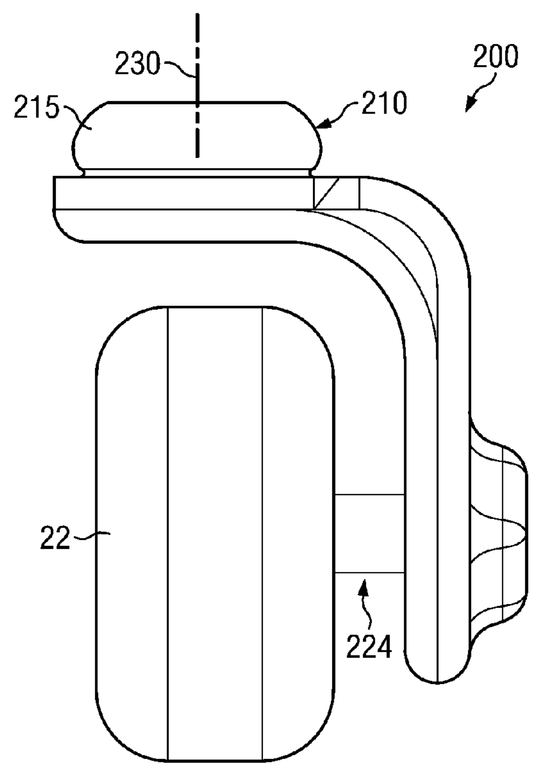
FIG. 5C depicts a front view of the example support member of FIGS. 5A and 5B, in accordance with embodiments of the present disclosure.
Figure 5D:
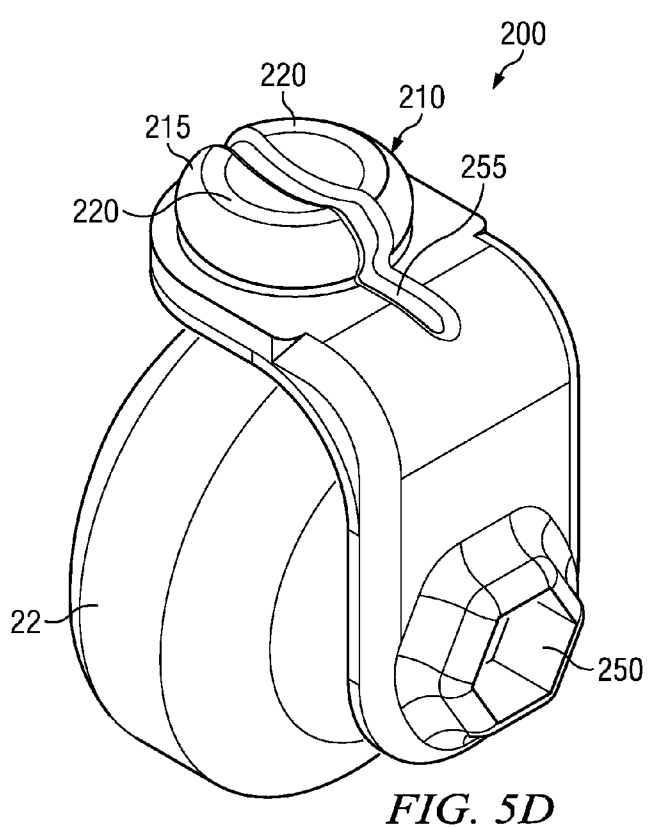
FIG. 5D depicts an isometric view of the example support member of FIGS. 5A through 5C, in accordance with embodiments of the present disclosure.

As can be seen in FIG. 4D, the upper portion (215) may further comprise a depression spanning the apposing flanges (220). The curvature and shape of the depression may be configured to correspond generally to the curvature and shape of the aperture of the receptacle component, such that when the support member is coupled with the receptacle component, a generally consistent curvature of the aperture is continued across the opening (120). This may facilitate a more secure connection with the distal end of a tripod or other elongate member.

The support member (200) may have a lower bore (228) through which an axle (224) for the wheel (22) may pass through. The support member (200) may also have a fastener (250), shown as a nut-and-bolt arrangement, used to secure the wheel (22) thereto. In use, a plurality of attachment members (10) may be attached to the legs of a tripod or similar mounting device to secure wheels (22) thereto. The axle (224) may have a bearing arrangement therein that enables smooth and continuous rolling to facilitate recording of video images or other types of images that require camera movement, while the wheel (22) may be in motion. A fixed and/or lockable connection between the support member (200) and the wheel (22) may prevent the wheels (22) from changing direction, enabling an attached camera and/or mounting device to be rolled smoothly along a desired path or in a desired direction by fixing the wheels (22) in a desired orientation. A fixed and/or lockable connection may also be disposed between the support member (200) and the receptacle component (100) such that the wheel (22) will only rotate in a fixed direction. In other embodiments, the wheels (22) may include casters to enable free rolling of the mounting device in any desired direction.

The support member (200) may be further defined by a central axis (230). The central axis (230) of the support member (200) may be positioned above the area in which a wheel would be engaged, such that when operatively engaged, the axis (230) of the support member (200) will generally intersect the central axis (130) of the receptacle component (100) attached thereto. In some embodiments, the central axis (130) of the receptacle component (100) and the axis (230) of the support member (200) may be perpendicular. In other embodiments, any of a variety of angles may be used. The central axis (230) may extend vertically through about the center of the engaging member (210). While any orientation between the support member (200) and the wheel (22) or other object attached thereto is usable, FIGS. 3A through 4D depict the support member (200) and the receptacle component (100) above the wheel (22) having a central axis that intersects the central axis of the wheel (22), enabling a tripod having adjustable and/or flexible legs or a similar device to be engaged to the wheel (22) from a variety of angles and/or positions. While this particular arrangement of components reduces the overall size and/or bulk of the attachment member (10) and may be suitable for engagement with a tripod having flexible legs, other embodiments may include differing angles and/or arrangements between the receptacle component (100), the support member (200), and the remainder of the attachment member, suitable for engagement with a non-flexible leg of a tripod that extends at a fixed angle.

Alternative Exemplary Support Members

Referring now to FIGS. 5A through 5D, an alternative embodiment of a support member (200) is shown. The embodiment shown in FIGS. 4A through 4D are configured to receive a first size of wheel, while that shown in FIGS. 5A through 5D are configured to receive a second size of wheel. In some embodiments, wheels that are 47 mm or 54 mm may be used. However, it will be appreciated that a variety of wheel sizes and orientations may be used as will be appreciated by one skilled in the art.

For example, in some embodiments, a wheel with a groove running substantially around the circumference of the wheel may be used. This groove may be in a v-shape, a rounded shape, or any other of a variety of forms. This groove may be at any position along the curvature of the wheel, including about the middle of the wheel. The groove may be any of a variety of depths. Such a groove may be configured to allow a wheel or wheels to follow a fixed path. For example, this may allow a wheel or wheels to roll along a track or rail system. This may also allow a wheel or wheels to roll down hand rails along a stairway or other fixed path.

Figure 6:
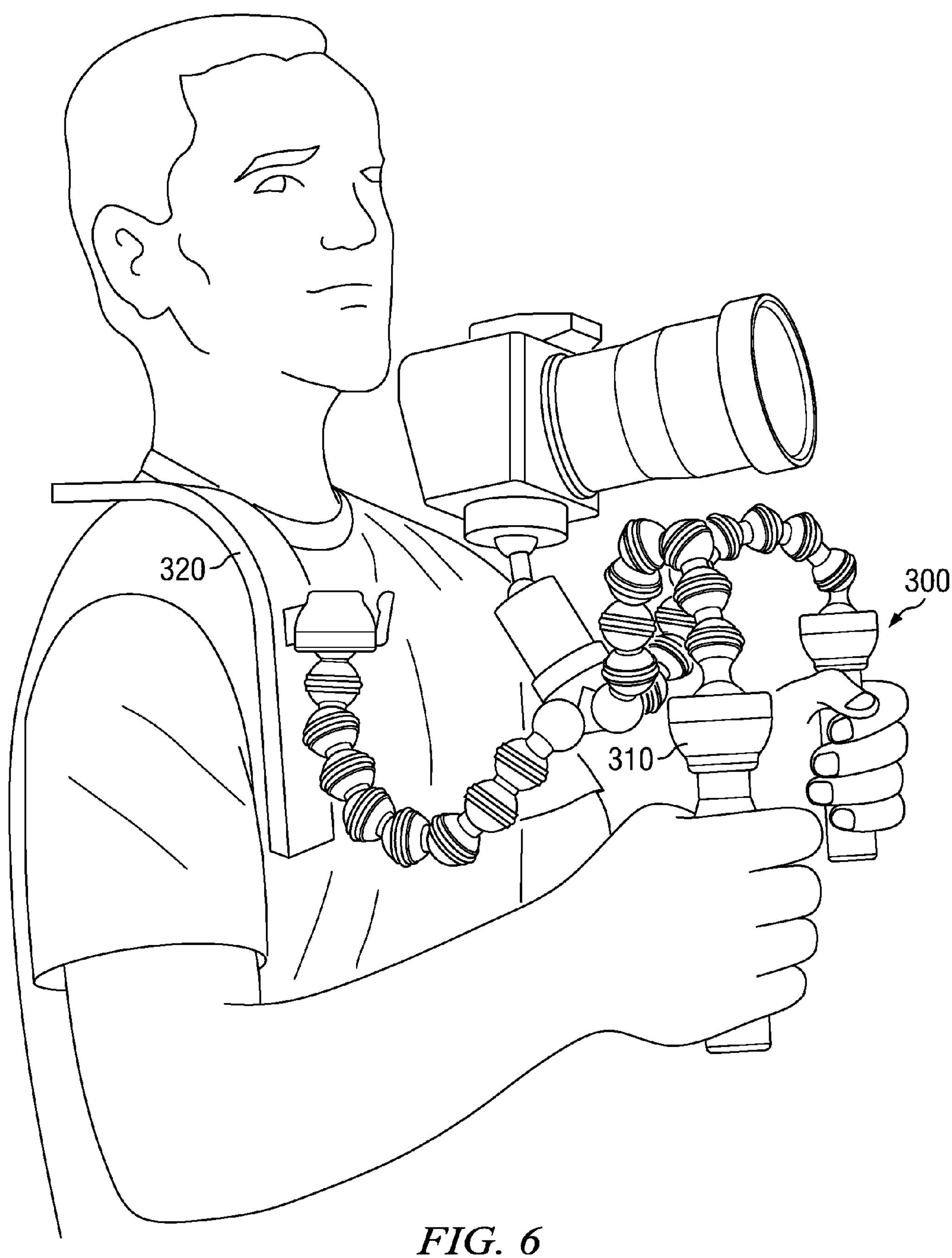
FIG. 6 depicts another example of a support member, in accordance with embodiments of the present disclosure.

Alternative embodiments of support members are also in accordance with the present disclosure. Referring now to FIG. 6, some embodiments may include a support member (300) configured to engage a receptacle component (100) as described above, and further configured as a handle (310) to be held by a user to support the mounting device. In another embodiment, a support member (300) may be configured to engage a receptacle component (100) as described above and may further comprise a shoulder pad (320) or other support that may be configured to rest against an operator. In other embodiments, a shoulder pad (320) may engage a leg of a mounting device. This may be done by an elastic material, a hook, a hoop, a magnetic connection, a snap-fit connection, and/or any other method as may be known in the art. In these and other embodiments, a series of two handle (310) embodiments and one shoulder pad (320) embodiment may be attached to a single mounting device or tripod, as shown in FIG. 6. Additionally, two, one, or no handles may be used in conjunction with the shoulder pad (320).

Figure 12:
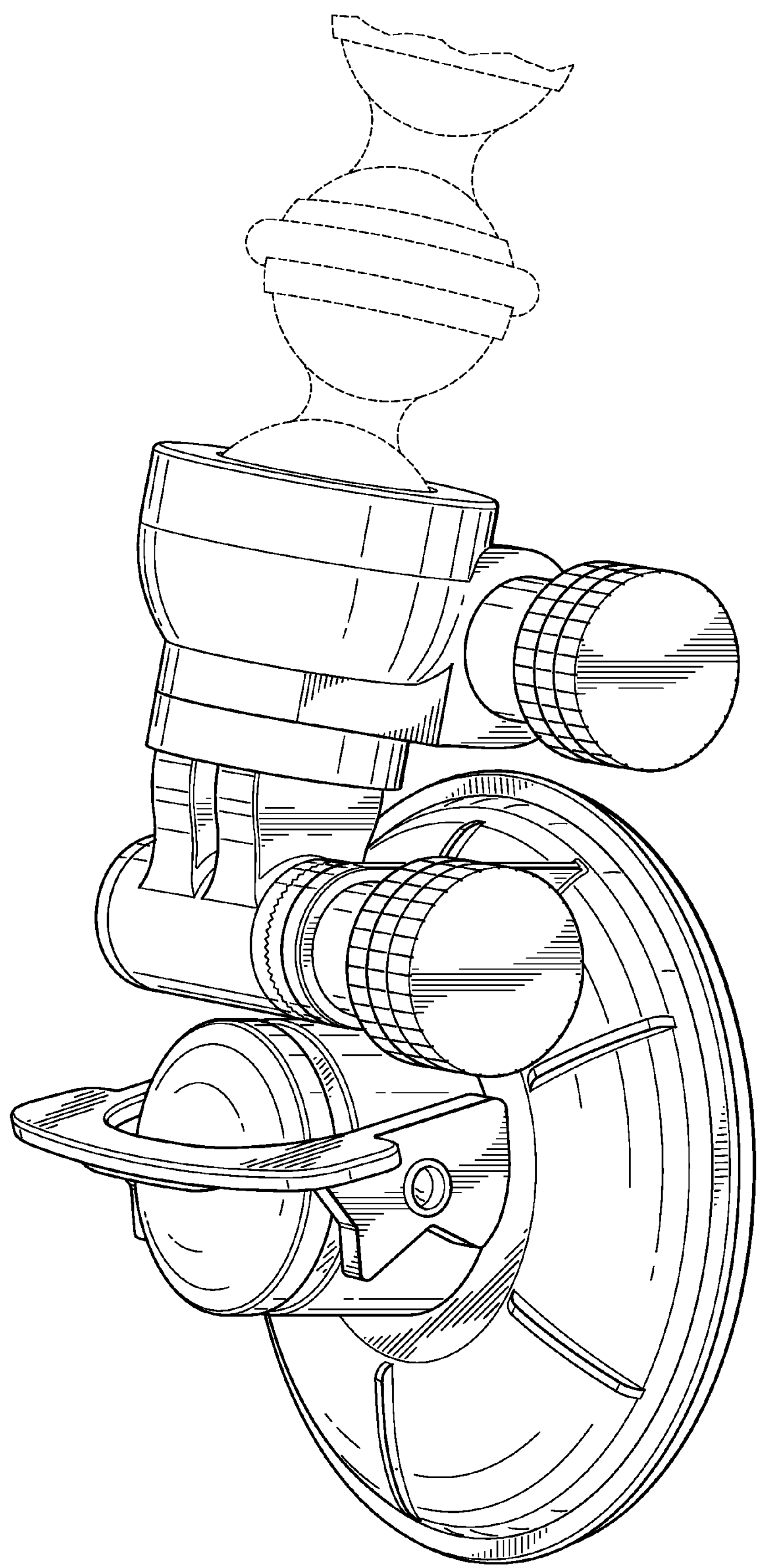
FIG. 12 depicts a perspective view of a suction cup embodiment of the present disclosure.

Another embodiment of a support member may include a component for removably securing a recording device to a surface, such as a suction cup, as shown in FIG. 12. The support member may further include elements or features configured to interact with the component such that the component can be securely attached to the support member. The support member may also include an upper portion configured to connect to a receptacle component.

In these and other embodiments, any of a variety or combination of configurations of support members may be removably attached to receptacle component (100). This may create a modular arrangement, where a single receptacle component (100) may be removably attached at different times to a variety of differently configured support members. For example, a support member with a first-sized wheel may be removably attached to receptacle component (100). That support member may then be removed (e.g., by hand), and a support member with a second-sized wheel may be removably attached to the same receptacle component (100). That support member may then be removed, and a support member with a handle may be removably attached to the same receptacle component (100). This example is in no way limiting, but instead serves to exhibit the modular nature of the receptacle component (100) and support member (200) in some embodiments.

Alternatively, multiple support members may be employed with a single receptacle component (100). For example, a receptacle component may be coupled to the distal end of a tripod or other elongate member. The receptacle component may additionally be coupled to a first support member. This support member may provide some functionality, for example, being configured to accept and connect to another support member. Any of the connection methods or means described above may be used. This first support member may also provide some other functionality, such as extended length, casters for free rotation, or the like. A second support member may then be coupled to the first support member or receptacle component. This second support member may provide an alternative functionality, or the same functionality. For example, it may provide an increase in length, or it may comprise wheels and provide a rolling functionality. These examples are merely illustrative of the principle that multiple support members may be coupled in series, or in parallel, to a single receptacle component to provide enhanced functionality.

Plate Embodiment

Figure 7:
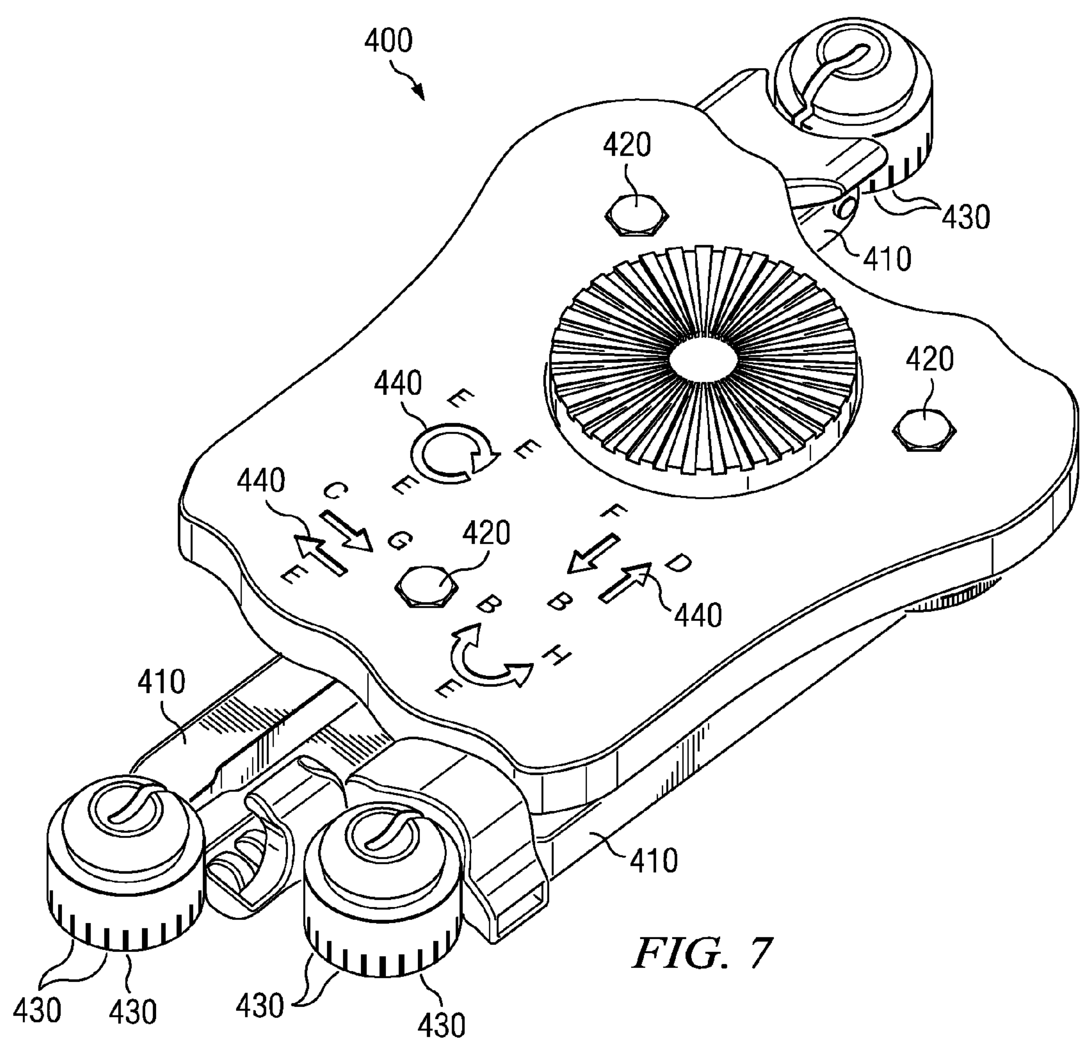
FIG. 7 depicts a plate embodiment, in accordance with embodiments of the present disclosure.

In another embodiment shown in FIG. 7, a plate (400) may be used to provide a particular motion or orientation. In such an embodiment, a plate (400) is provided with three movable arms (410). The arms may be joined to the plate by a pivoting joint (420) at a proximate end of the arms. This pivoting joint (420) may be configured to allow the arms (410) to rotate in only one plane substantially parallel with the plane of the plate (400), or alternatively the arms (410) may move freely. An attachment member, configured to receive the distal end of a tripod or other elongate member, may be provided on the distal end of the arms. In some embodiments, the attachment member may be a unitary body with the arm. The attachment member may be positioned upon the distal end of the arm such that it may comprise a receptacle component coupled to a support member. Such a support member may be any of those described above, including support members comprising wheels. In some embodiments, the support member portion of the attachment member may be a unitary piece with the arm.

Alternatively, the one or more attachment members disposed upon the respective arms or plate itself may be configured to receive a support member, and an alternative one or more receptacle components of this embodiment may be removably coupled upon the upper side of the plate or arms to receive the distal end of a tripod or other elongate member. The receptacle component configured to receive a support member need not necessarily contain components required to receive a distal end of a tripod or other elongate member, and need only have the requisite components to receive a support member. Thus, the receptacle component may be similar to a support member with the enhanced functionality of receiving another support member. For example, in some embodiments a set of support members including wheels may be removably coupled to a respective set of attachment members coupled to the arms, and a separate set of receptacle components may be disposed on the upper side of the plate to receive the legs of a tripod. In an alternative example, a set of support members including wheels may be disposed on the lower side of the plate and a separate set of receptacle components may be disposed on the upper surface of the distal end of the arms to receive the distal ends of a tripod.

In some embodiments, the plate may be configured for directly attaching an imaging recording device or joint associated therewith. This may be in addition to, or instead of the receptacle components configured to receive a distal end of a tripod or other elongate member.

In an additional embodiment, also shown in FIG. 7, the attachment member disposed at the end of the arms may comprise a first support member configured to receive a second support member. This first support member may additionally have markings (430), for example, at regular intervals around the circumference of the first support member, with each of the markings indicating some degree of rotation of a removably coupled second support member (e.g., characters A-H marked on the first support member representing a degree of rotation of a removably coupled second support member). There may also be means for locking the support member in a particular orientation (e.g., to lock the wheels in a desired orientation). This may be a friction fit, or may be some component locking the wheels. Using these markings (430), a user could be provided with instructions (440) to set each of the second support members to a given orientation designated by its position relative to the marking (430) or indicator, and thus achieve a desired movement or orientation. This may facilitate ease and speed in achieving a desired movement or orientation, for example, an arcuate path, circular motion, or linear motion. These instructions (440) may be provided upon the face of the plate (400). For example, the instructions (440) might suggest setting three wheels at to the marking (430) "E," which could correspond to circular motion of the wheels. An operator might elect a particular position, movement, or combination thereof based on instructions 440.

The plate may further comprise a locking means for locking the arms in a given orientation. This orientation may be any of a variety of orientations, for example closed, fully extended, and at various increments of extension. Additionally, each of these orientations may have a marking or indicator associated with the orientation. As described above, this may facilitate ease and speed in achieving a desired movement or orientation.

Varied Exemplary Orientations and/or Movements

Figure 8A:
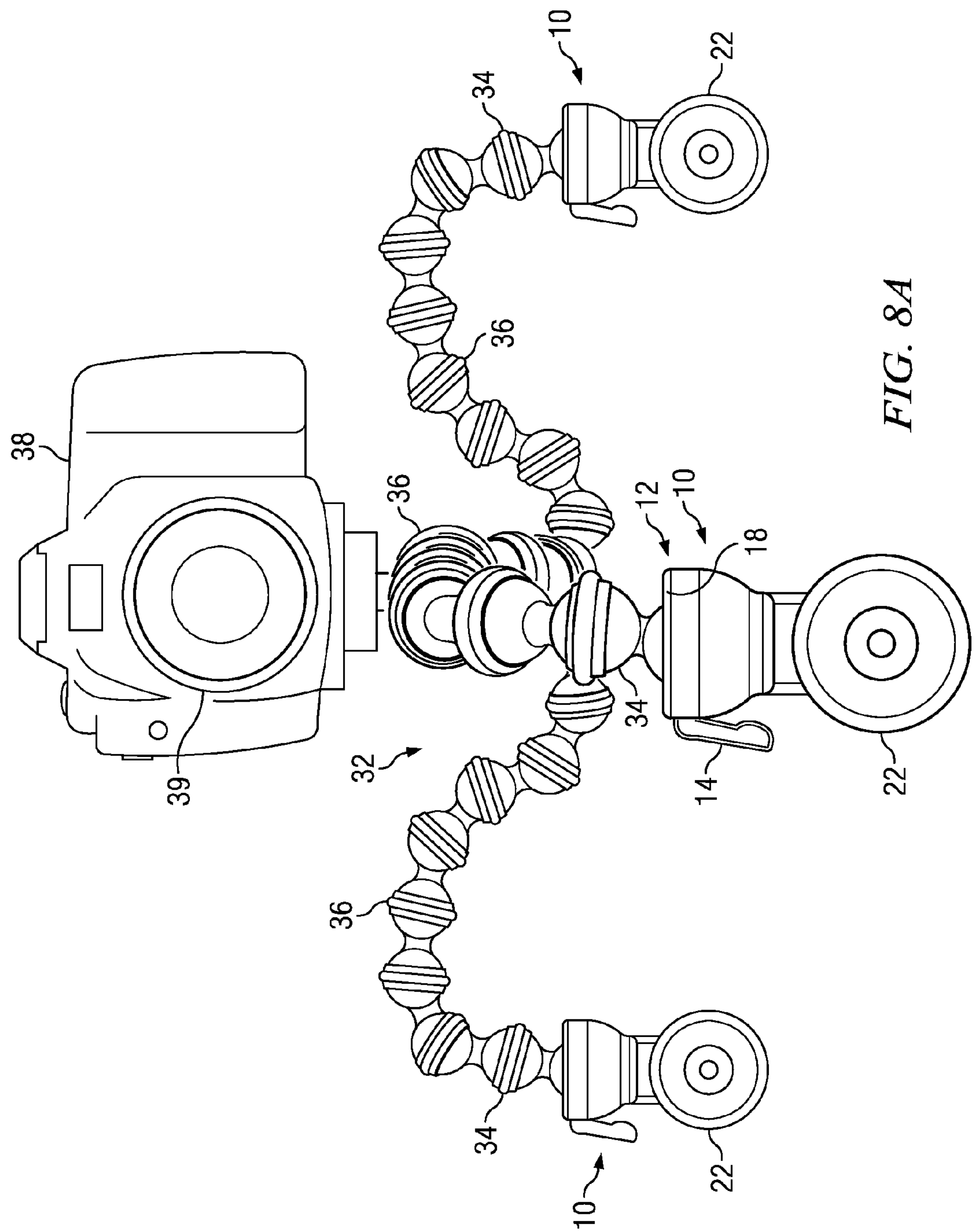
FIG. 8A depicts a perspective view of an example system engaged with a mounting device having a recording device secured in association therewith, in accordance with embodiments of the present disclosure.
Figure 8B:
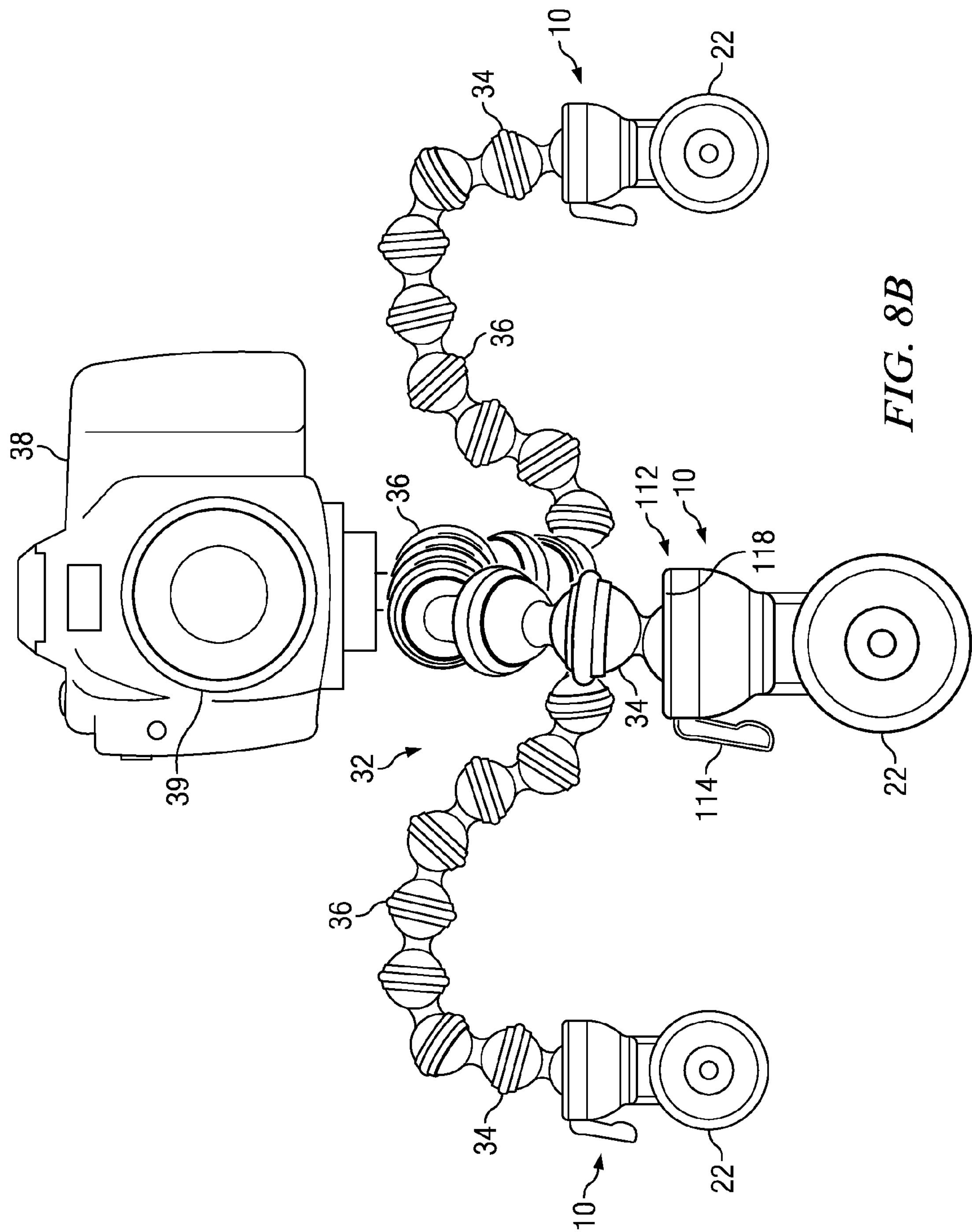
FIG. 8B depicts a perspective view of another example embodiment of a system engaged with a mounting device having a recording device secured in association therewith, in accordance with embodiments of the present disclosure.

Referring now to FIGS. 8A and 8B, an example of a system for recording images and/or providing a desired motion and/or position to a recording device, in accordance with embodiments of the present disclosure is shown. Specifically, a plurality of attachment members (10), similar to the embodiments shown in FIGS. 1 and 2A through 2D, are depicted engaged with the legs of a mounting device (32), shown as a tripod having flexible legs able to be bent or otherwise configured or oriented to provide a camera with various orientations and/or to enable the tripod to fit within desired spaces having limited dimensions. Alternatively, a plurality of attachment members (10), similar to the embodiments shown in FIGS. 3A through 5D are depicted engaged with the legs of a mounting device (32), shown as a tripod having flexible legs able to be bent or otherwise configured or oriented to provide a camera with various orientations and/or to enable the tripod to fit within desired spaces having limited dimensions. As described previously and shown in FIG. 8A, a first portion (34) of each leg of the mounting device (32) may be engaged within a receptacle (12) of a respective attachment member (10), the circumference (18) of which may be tightened and/or otherwise secured using a mechanism (14). Thus, the axis of the first portion (34) of each leg may be generally parallel to the central axis (30) of the corresponding receptacle (12), while at least one other portion (36) of each leg may have a differing angle, such that the other portion (36) may not be generally parallel with the central axis (30) of the receptacle (12), due in part to the flexible nature of the mounting device (32) shown. FIG. 8B shows a similar orientation as that seen in FIG. 8A, but employing an embodiment using distinct receptacle components and support members.

In the orientation shown, the wheels (22) may be positioned to roll the mounting device (32) along an arcuate, circular path, such that the recording device (38) may fully or partially circle an object within the center of the path, while the recording device (38) continuously faces toward the center of the circular path and maintains a constant distance from the center. Thus, the mounting device (32) and recording device (38) may be rolled in a direction generally parallel to that of the face of the lens (39), enabling the capture of images during sideways, arcuate movement of the recording device (38) along a curved path.

Figure 9A:
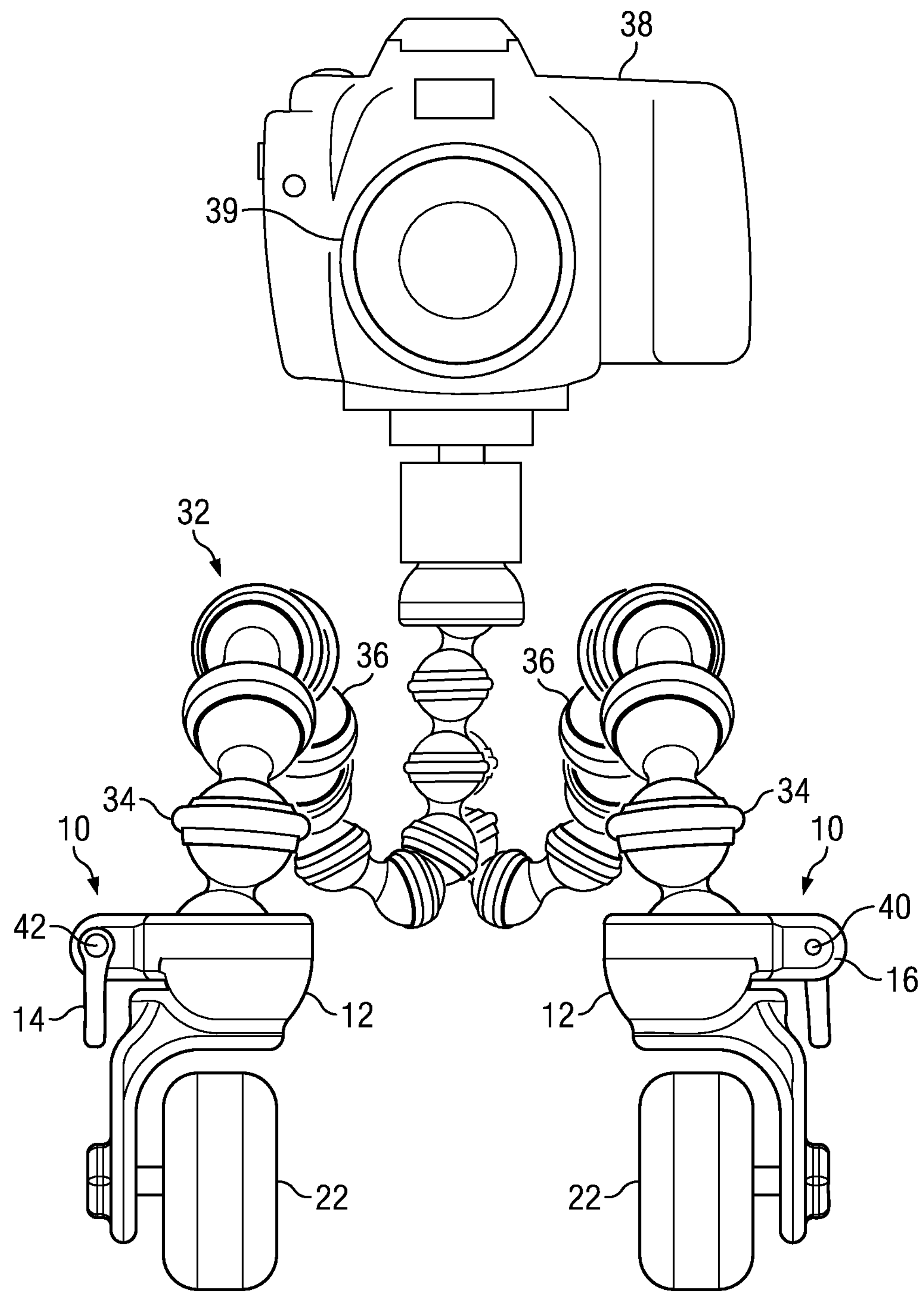
FIG. 9A depicts a perspective view of the example system of FIG. 3A, having the mounting device and recording device positioned in an adjusted orientation, in accordance with embodiments of the present disclosure.
Figure 9B:
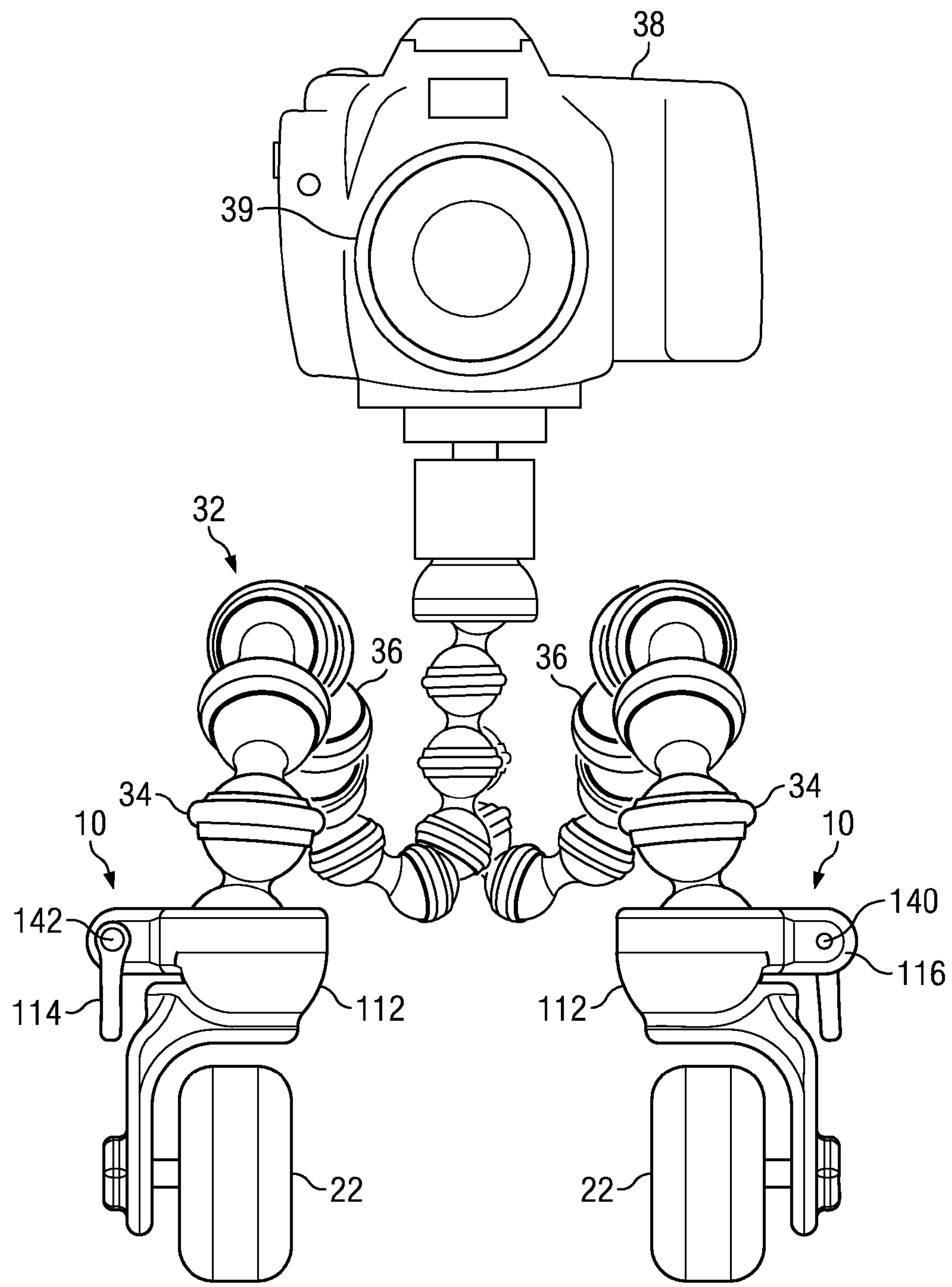
FIG. 9B depicts a perspective view of the example system of FIG. 3B, having the mounting device and recording device positioned in an adjusted orientation, in accordance with embodiments of the present disclosure.

Referring now to FIGS. 9A and 9B, the system of FIGS. 8A and 8B is shown in a configuration different from that depicted in FIGS. 8A and 8B. Specifically, two legs of the mounting device (32) are shown positioned toward the front of the recording device (38), while a third leg (not shown) may be positioned toward the rear thereof. As described previously and shown in FIG. 9A, the distal ends (34) of each leg of the mounting device (32) may be engaged within corresponding receptacles (12) of respective attachment members (10), using tightening mechanisms (14) that secure the legs therein by biasing compression flanges (16) toward one another. FIG. 9A shows a pin (40) extending through the compression flanges (16), such that manipulation of the mechanism (14), which may be threaded to the pin (40) using a screw (42) or similar fastener, exerts a force thereon that biases the compression flanges (16) toward one another. Similarly, the mechanism (14) may be manipulated to release this force to enable removal of the attachment members (10) from the legs of the mounting device (32). Similarly, as shown in FIG. 8B, the distal ends (34) of each leg of the mounting device (32) are shown engaged within corresponding receptacle component (112) of respective attachment members (10), using tightening mechanisms (114) that secure the legs therein by biasing compression flanges (116) toward one another. FIG. 9B further shows a pin (140) extending through the compression flanges (116), such that manipulation of the mechanism (114), which may be threaded to the pin (140) using a screw (142) or other fastener, exerts a force thereon that biases the compression flanges (116) toward one another.

Similarly, the mechanism (114) may be manipulated to release this force to enable removal of the attachment members (10) from the legs of the mounting device (32).

In the orientation shown, the wheels (22) are positioned to rotate along a path generally perpendicular to the face of the lens (39) of the recording device (38). Thus, the mounting device (32) and recording device (38) may be rolled in a direction generally perpendicular to that of the face of the lens (39), enabling the capture of images during forward or backward movement of the recording device (38). Additionally, the depicted orientation of the legs of the mounting device (32) and the attachment members (10) may provide the mounting device (32) with a narrow width, enabling recording of images while moving along a path where space and/or access may be limited, such as a narrow ledge or rail.

Figure 10:
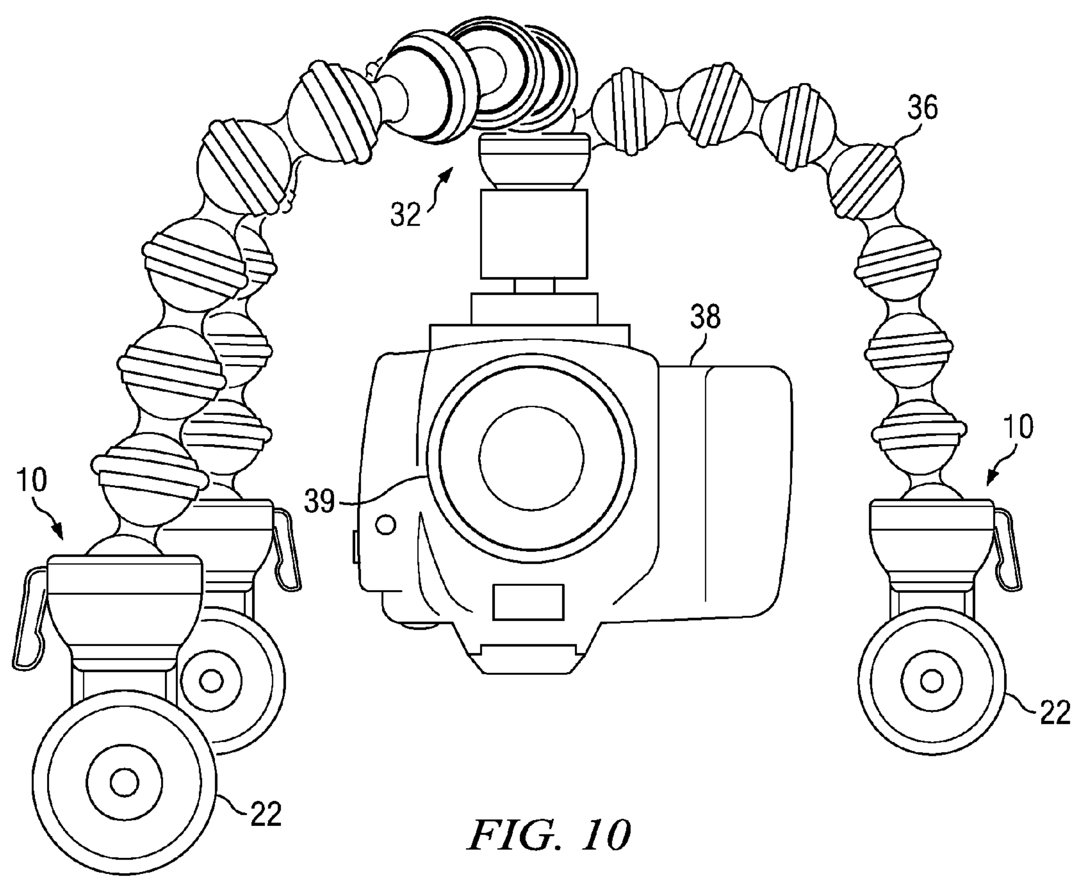
FIG. 10 depicts a perspective view of the example system of FIGS. 7A and 8A, having the mounting device and recording device positioned in an alternate adjusted orientation.

Referring now to FIG. 10, the example system of FIGS. 8A and 9A is shown in another configuration. Specifically, the mounting device (32) is shown in an inverted orientation, with the legs thereof adjusted to each engage a respective attachment member (10) in the manner described previously. As such, the recording device (38) may engage with the mounting device (32) in an inverted (e.g., upside-down) orientation, enabling the recording device (38) to be placed proximate to the ground or other surface upon which the mounting device (32) may be positioned (e.g., for capturing a low perspective and/or worm's eye image). In the orientation shown, the wheels (22) may be positioned to rotate along a path generally perpendicular to the face of the lens (39) of the recording device (38). Thus, the mounting device (32) and recording device (38) may be rolled, for example, in a direction generally parallel, generally perpendicular, etc., to that of the face of the lens (39), enabling the capture of images that are upside-down (e.g., inverted) and adjacent to the ground or other surface, during movement of the recording device (38) along the surface.

It should be understood that while FIGS. 8A through 10 depict orientations in which the mounting device (32) and recording device (38) may be moved sideways, forward, and/or backward, other orientations between the wheels (22) and the recording device (38) may be used to enable movement of the mounting device (32) and recording device (38) in non-orthogonal directions. In further embodiments, the wheels (22) may be oriented with respect to the mounting (32) device and/or with one another to enable the mounting device (32) and recording device (38) to be smoothly rolled along a non-linear path (e.g., a curved and/or turning path), to be spun or rotated, or otherwise configured to travel any desired path usable to capture images during movement of the recording device (38).

In other embodiments varied combinations of wheel-based support members with varied casters and/or bearings may be employed. For example, in a three wheel configuration, if one wheel member comprises casters and/or bearings such that the wheel can rotate freely, only two wheels would need to be locked and oriented to achieve a desired motion as the wheel with casters and/or bearings could rotate freely in the orientation defined by the other two wheels. Alternatively, in a three wheel configuration, if two wheel members comprise casters and/or bearings such that the wheels can rotate freely, only one wheel would need to be locked and oriented to achieve the device rolling in a generally straight direction. It will be appreciated that the casters and/or bearings may be incorporated into the support member, or may be a separate component disposed between the support member and the receptacle component. For example, the separate component may be an alternative support member as described above such that a wheel support member and a caster support member may be attached in serial to a single receptacle component.

In other embodiments, the system may include one or more motorized and/or remotely controllable wheels or similar positioning members for enabling controlled turning, movement, and positioning of the recording device (38) during use. Such a motor may have variable speeds, for example, from an extremely slow speed resulting in the device travelling about 1 cm per day or 1 cm per hour, up to about 10 cm per second, 30 cm per second, or even faster. This variety of speeds may be achieved by multiple motors, or by a single motor. Additionally, there may be motors attached to a single wheel, or to multiple wheels. These multiple motors may function at different speeds to provide alternative movements as desired. In other embodiments, a motor may be mechanically powered rather than electrically powered, such as a wind-up motor. Further, the motor may be a stepper motor or may be a DC motor.

Additionally, while the drawings described above depict a particular embodiment in which wheels (22) with bearing assemblies are used to provide the recording device (38) with smooth, continuous movement during which the capture of quality images may be possible, in other embodiments, the attachment members (10) may be provided with other means for positioning the mounting device (32) and recording device (38), such as stabilizing feet, magnets, or one or more fastening media, such as adhesive, Velcro™, suction cups, mounting brackets, or similar fasteners, ice skating blades, floats, rope and pulley systems, remotely controllable and/or motorized members, or other members usable to move and/or position the mounting device (32) and/or recording device (38). Thus, embodiments described herein are usable to provide a mounting device and/or recording device with a selected position relative to a surface (e.g., by securing the mounting device to a ferromagnetic surface using magnets, or to a non-ferromagnetic surface using another fastening means), or a selected motion relative to a surface (e.g., through use of wheels, casters, etc.).

Time-Lapse Photography

Figure 11:
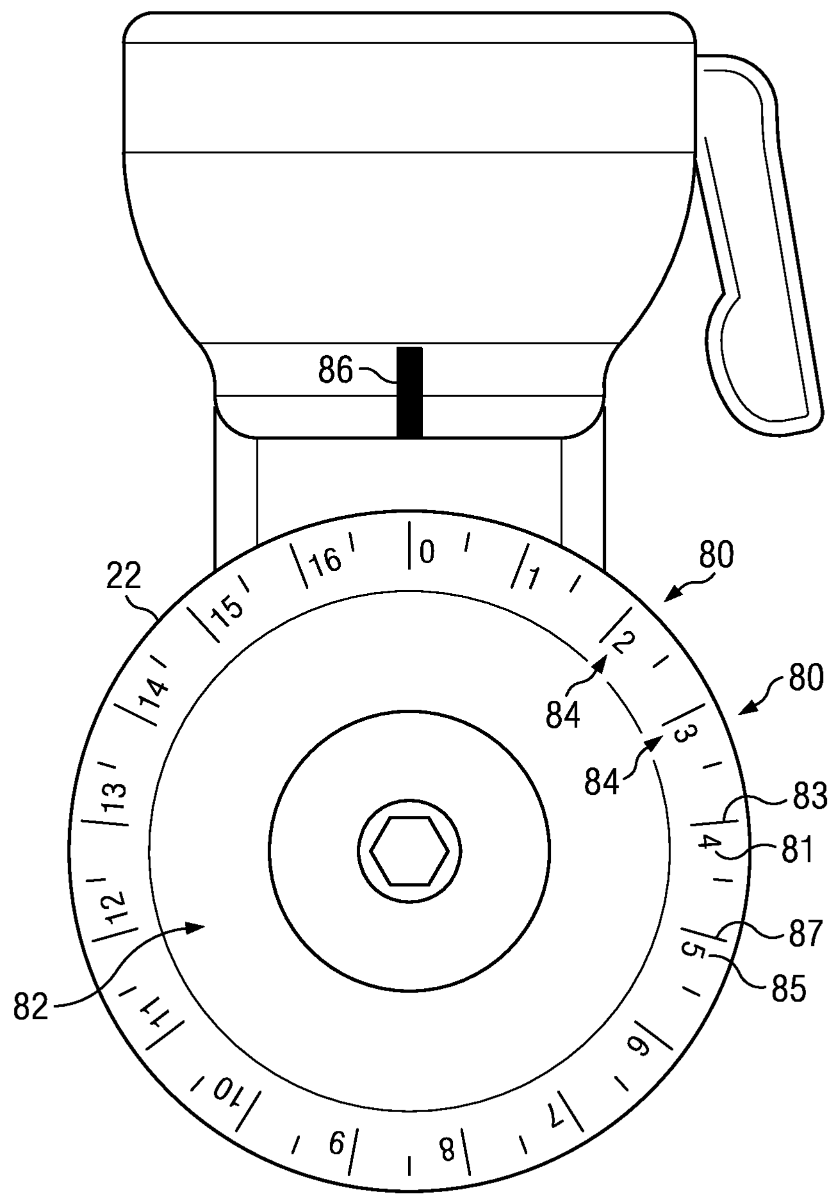
FIG. 11 depicts a perspective view of an example of a wheel with indicators on the face of the wheel, in accordance with embodiments of the present disclosure.

Referring now to FIG. 11, another example embodiment in accordance with the present disclosure is depicted. In particular, an embodiment that may be used in time-lapse photography, or any other setting where a measured or precise movement may be desired. In some embodiments, indicators (80) may be placed at periodic intervals along the face (82) of a wheel (22). Indicators (80) may include any suitable graphical, alphabetical, numerical and/or alphanumerical indicator (e.g., Arabic numbers as shown in FIG. 10). In some embodiments, there may be 34 indicators (80) along the face (82) of the wheel (22). In still other embodiments, any of a variety of alternative markings (84) may be used, and indicators (80) may comprise alternative markings (84). For example, in some embodiments, a combination of Latin alphabetical characters, Arabic numerical characters, and graphical figures may be used as indicators (80). These indicators (80), possibly including alternative markings (84) or any combinations thereof, may be painted, etched, printed and/or applied by any other suitable method upon the wheel (22).

A recording device may be coupled to the wheel (22) containing indicators (80), alternative markings (84), or a combination thereof. This may be done as described above, using an attachment member (10), and/or a mounting apparatus (32). This may also be done using a receptacle component (100), support member (200), and/or mounting apparatus (32). In other embodiments, any other means as may be known in the art may be used to attach the recording device to the wheel (22), including, but not limited to, a camera dolly, a tripod, or a direct connection. The recording device may be attached to a single wheel, or a plurality of wheels. Additionally, a single wheel of the plurality of wheels may have indicators (80), alternative markings (84), or a combination thereof, or any combination of the plurality of wheels may have such markings After being coupled to one or a plurality of wheels (22), a recording device may be positioned to take a first image and a particular indicator (80) or alternative marking (84) on the wheel (22) may be aligned with a reference point (86). The reference point (86) may be a marking, a cut, or any other feature which will remain fixed relative to the wheel (22) as the wheel (22) rotates. In some embodiments, the cleft (255) may be configured to function as the reference point (86). After being aligned, a first image may then be captured. The wheel or plurality of wheels (22) may then be rotated until a next desired indicator (81) or alternative marking (83) may be aligned with the reference point (86). Another image may then be captured either immediately or after a desired time has passed. If so desired, the wheel or plurality of wheels (22) may again be rotated until another desired indicator (85) or alternative marking (87) may be aligned with the reference point (86). If so desired, another image may then be captured either immediately or after a desired time has passed. These steps may be repeated as many times as desired. Upon completion of the gathering of images, the sequence of images may be compiled into a video. The images may thus be captured, for example, at equally spaced distances as the recording device moves along a desired path.

In some embodiments, a motor may be coupled with a wheel member for controlled motion, such as for time-lapse photography. This motor may be a wind-up motor employed to provide the desired motion. This motion may have any of a variety of speeds and durations equating to a variety of distances travelled, and the images may be captured at predetermined indicators (80) or alternative markings (84) of one or more wheels (22).

The embodiments described herein thereby provide systems and methods that enable recording of images while providing a selected movement or position to a recording device, that include use of portable, inexpensive attachment members that are able to be installed and removed rapidly (e.g., by hand), and interchanged as needed, providing a beneficial alternative to cumbersome, expensive, less-portable equipment. Moreover, various embodiments provide systems and methods for capturing of images during predefined motion, for example, along a desired path or at regular distance intervals (e.g., time lapse photography). Additionally, various embodiments provide systems and methods for coupling components, including a receptacle component configured to detachably couple with an elongate member, and a support member configured to detachably couple with the receptacle component, the support member configured such that an upper portion of the support member detachably couples with an opening of the receptacle component.

While various embodiments in accordance with the present disclosure have been described with emphasis, it should be understood that within the scope of the appended claims, the present disclosure may be practiced other than as specifically described herein.

What is claimed is:

1. A system comprising:

a plate comprising:

a plurality of first support members;

a plurality of arms, at least one of the plurality of first support members disposed upon at least one of the plurality of arms; and a plurality of second support members, the second support members configured to removably couple with the first support members, each of the second support members comprising an upper portion wherein the upper portion is configured in a spherical segment and includes a cleft separating two apposing flanges, and wherein an opening of one of the plurality of first support members is configured to removably couple with the upper portion by forcing the two apposing flanges into proximity until the upper portion has passed through the opening.

2. The system of claim 1, at least one of the second support members being rotatable about a coupling between a first and the at least one of the second support members, the first support member comprising a series of indicators at regular intervals about the circumference of the first support member, the indicators corresponding to a degree of rotation of the at least one of the second support members.

3. The system of claim 1, the plate further comprising a connection for a recording device or ball joint to be connected directly to the plate.

4. A method comprising:

removably coupling a recording device to a plate, the plate comprising:

a plurality of first support members;

a plurality of arms, at least one of the plurality of first support members disposed upon at least one of the plurality of arms;

removably coupling at least one second support member to at least one of the plurality of first attachment members, the second support member comprising an upper portion wherein the upper portion is configured in a spherical segment and includes a cleft separating two apposing flanges, and wherein an opening of the at least one of the plurality of first attachment members is configured to removably couple with the upper portion by forcing the two apposing flanges into proximity until the upper portion has passed through the opening;

orienting at least one of the at least one second support members relative to a respective first support member to provided a selected position, a selected movement, or combination thereof to the recording device; and recording an image with the recording device while the recording device is oriented in the selected position, the selected movement, or the combination thereof.

5. The method of claim 4, wherein recording an image comprises at least one of recording and storing, recording and broadcasting, recording and streaming, or recording and discarding an image.

6. The method of claim 4, further comprising locking at least one of the at least one second support members in an orientation.

7. The method of claim 4, further comprising:

electing a particular position, movement, or combination thereof to be provided to the recording device based on a set of instructions on the plate;

wherein the set of instructions comprises combinations of orientations of one or more of the second support members to provide an elected position, movement, or combination thereof.

* * * * *